United States Patent [19]
Inzinna et al.

[11] Patent Number: 5,940,926
[45] Date of Patent: Aug. 24, 1999

[54] MULTIPLE PORT EVACUATION APPARATUS HAVING INDEPENDENT VACUUM LEVEL CONTROL

[75] Inventors: Richard Inzinna; Mark G. Merritt, both of Rochester, N.Y.

[73] Assignee: Eastman Kodak Company, Rochester, N.Y.

[21] Appl. No.: 08/914,711

[22] Filed: Aug. 19, 1997

[51] Int. Cl.⁶ .................................................... A47L 5/18
[52] U.S. Cl. .................................. 15/301; 15/314; 15/409
[58] Field of Search .............................. 15/301, 314, 409

[56] References Cited

U.S. PATENT DOCUMENTS

| | | |
|---|---|---|
| 3,471,890 | 10/1969 | Ramo ........................................ 15/301 |
| 3,654,829 | 4/1972 | Anderson . |
| 3,761,996 | 10/1973 | Tell ....................................... 15/409 X |
| 3,800,643 | 4/1974 | Scott et al. . |
| 4,759,246 | 7/1988 | Herrington . |
| 4,779,397 | 10/1988 | Christine et al. . |
| 4,821,614 | 4/1989 | Fleet et al. . |
| 5,173,987 | 12/1992 | Buckingham ............................. 15/301 |
| 5,205,847 | 4/1993 | Montieth et al. . |
| 5,606,767 | 3/1997 | Crlenjak et al. .......................... 15/301 |

*Primary Examiner*—Elizabeth McKane
*Attorney, Agent, or Firm*—Susan L. Parulski

[57] ABSTRACT

An evacuation apparatus for evacuating waste particles from a plurality of waste sources. A plurality of vacuum lines are in fluid communication with a collector for transporting the waste particles from the waste source to the collector. An ejector is disposed in each of the vacuum lines to provide independent adjustable control of the vacuum level at each inlet.

4 Claims, 1 Drawing Sheet

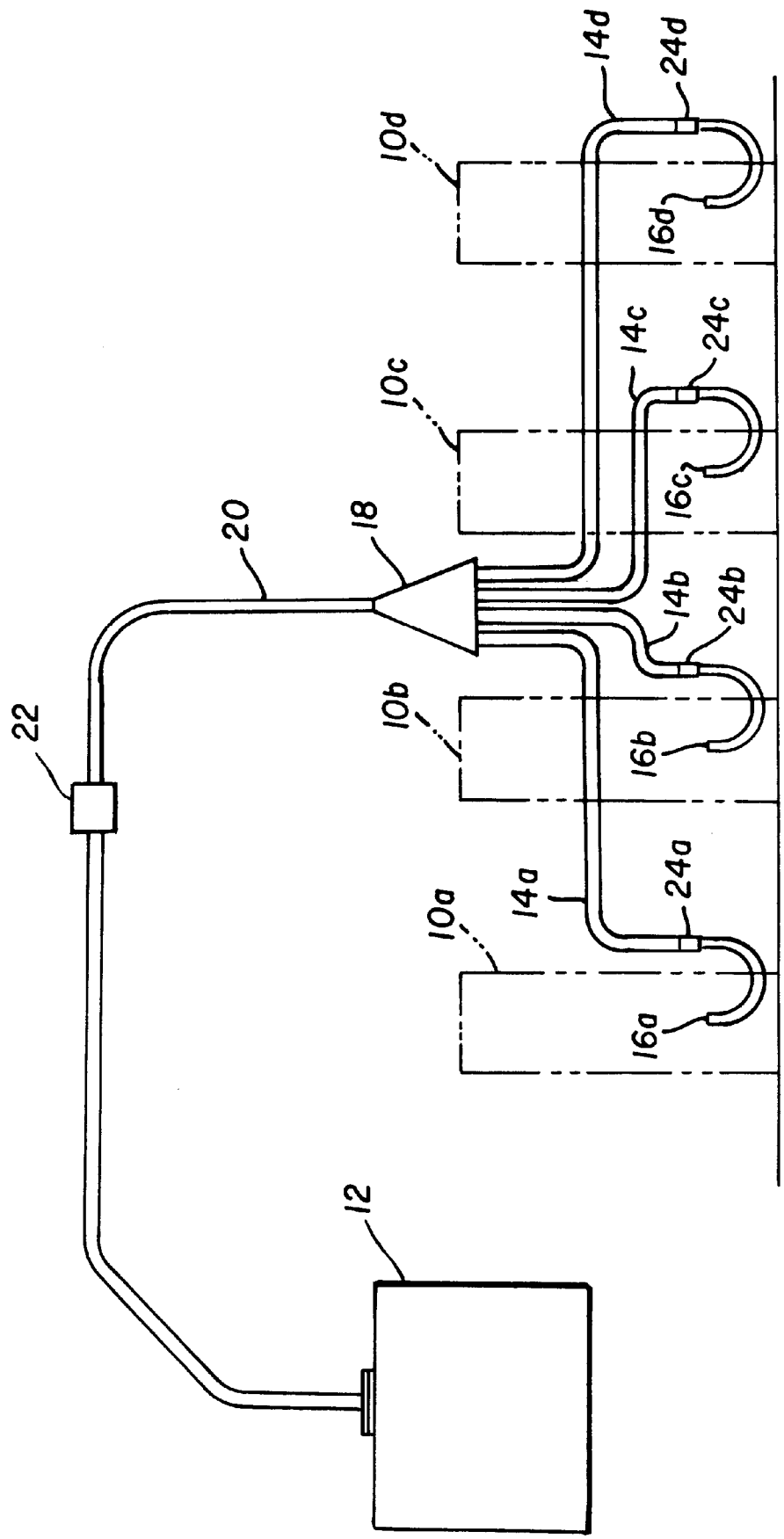

MULTIPLE PORT EVACUATION APPARATUS HAVING INDEPENDENT VACUUM LEVEL CONTROL

FIELD OF THE INVENTION

The invention relates to an evacuation apparatus and method. More particularly, the invention relates to an evacuation apparatus for evacuating waste particles from multiple locations and collecting them in a single collection hopper.

BACKGROUND OF THE INVENTION

In the manufacturing process, a waste particle may be formed. For example, in the operation of a punch press, a punch interacts with a die to form a hole in a workpiece. The resultant slug cut from the workpiece is a waste particle which needs to be removed from the work area. If not removed, the slugs can contaminate the workpiece or work area, or hang up in the punch press. Preferably, the slugs are transferred to a remote area where they can be collected and removed, thereby freeing the operator for other duties.

In the manufacturing of webs of flexible material (for example, photosensitive paper and film), waste particles such as edge trimmings and hole punchings, may be generated during the operations of chopping, cutting, slitting, punching, and packaging. If not removed, the waste particles can contaminate the final product. Such waste particles are often difficult to collect because they are flexible, small, lightweight, and contain microscopic debris. Further, because the manufacturing operation can be continuous, there may be numerous locations (i.e., sources) wherein waste particles are simultaneously being formed.

Vacuum has been used to suction and remove waste particles. U.S. Pat. No. 4,759,246 (Herrington) teaches the use of a suction device for aspirating the punched-out portions of a film web to a waste disposal. Similarly, U.S. Pat. No. 4,779,397 (Christine), U.S. Pat. No. 3,800,643 (Scott), and U.S. Pat. No. 3,654,829 (Anderson) teach a punch press apparatus employing vacuum to suck slugs into a collection bin. U.S. Pat. No. 5,205,847 (Montieth) relates to an air cleaning apparatus wherein air and scrap pieces of material are directed into a rotating perforated drum. A high velocity jet of air transfers the scrap pieces into a hopper.

When waste particles are transferred from a plurality of locations/sources to a single collection hopper, the vacuum levels at each particle waste source may not be uniform, particularly if the collection hopper is located remotely. Nonuniform vacuum levels can adversely affect the manufacturing process. For example, vacuum fluctuations can result in obstructions in the removal system and inconsistent quality levels of a manufactured product.

Accordingly, a need continues to exist for an evacuation apparatus wherein independent vacuum level control is provided at each particle waste source so that a uniform vacuum level can be obtained to remove waste particles from a plurality of sources. Such an apparatus must be robust to continuously operate in a manufacturing environment, and must be suitable for flexible web material such as photosensitive film and paper. Further, the apparatus should provide an economical and safe method of removing waste particles, promote a quality manufactured product, and have minimal impact on the manufacturing process.

SUMMARY OF THE INVENTION

An object of the invention is to provide an evacuation apparatus wherein independent vacuum level control is provided at each particle waste source to remove waste particles from a plurality of sources.

Another object of the invention is to provide such an apparatus which includes a feature to ensure that the waste particles flow away from the manufacturing equipment so as to not disrupt the manufacturing equipment.

A further object of the invention is to provide such an apparatus which is suitably robust to operate continuously in a manufacturing environment.

Still another object of the invention is to provide such an apparatus which is suitable for removing waste particles of flexible web material, including photosensitive web and paper.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an apparatus for evacuating waste particles from a plurality of waste sources. The apparatus includes a collector disposed remotely from the plurality of waste sources to collect the waste particles. A plurality of vacuum lines are in fluid communication with the collector for transporting the waste particles to the collector. Each of the vacuum lines has an inlet, and at least one inlet is disposed adjacent each waste source. A negative pressure is introduced through the plurality of vacuum lines by means of a vacuum source in fluid communication with each of the plurality of vacuum lines. At least one of a plurality of ejectors is disposed in each of the plurality of vacuum lines downstream of the waste source such that each of the plurality of ejectors provides an independent adjustable control of the vacuum level for each corresponding inlet.

According to another aspect of the invention, there is provided a method for evacuating waste particles from a plurality of waste sources. A collector is disposed remotely from the plurality of waste sources to collect the waste particles, with an inlet of a vacuum line disposed adjacent each of the plurality of waste sources. A negative pressure is introduced through the plurality of vacuum lines to direct an air flow toward the collector. The negative pressure is independently adjusted through each of the plurality of vacuum lines to independently control the negative pressure at each inlet, whereby the waste particles are transported through the vacuum lines to the collector.

The present invention provides an evacuation apparatus wherein independent vacuum level control is provided to remove waste particles from a plurality of sources. The apparatus is operable in a manufacturing environment and is particularly suited for removing waste particles of flexible web material, including photosensitive web and paper. A feature ensures that the waste particles flow away from the manufacturing equipment so as to not disrupt the manufacturing equipment.

BRIEF DESCRIPTION OF THE DRAWING

The foregoing and other objects, features, and advantages of the invention will be apparent from the following more particular description of the preferred embodiments of the invention, as illustrated in the accompanying drawings.

FIG. 1 shows an evacuation apparatus according to the present invention.

DETAILED DESCRIPTION OF THE INVENTION

The following is a detailed description of the preferred embodiments of the invention, reference being made to the drawings in which the same reference numerals identify the same elements of structure in each of the several figures.

An apparatus for evacuating waste particles W is generally illustrated in FIG. 1. The apparatus includes a plurality of waste sources 10. In the manufacturing process, such waste sources 10 can be a punch/die operation resulting in a waste particle W in the form of a slug. Other examples of waste particles are edge trimmings or hole punchings generated during the waste source operations of chopping, cutting, slitting, punching, and packaging. For a particular example of photosensitive film, a waste particle occurs when a perforation is formed in the film by a punch/die operation. A plurality of waste sources 10 are illustrated in FIG. 1 as waste sources 10a, 10b, 10c, 10d.

A collector 12 is communicably disposed remotely downstream from waste sources 10a, 10b, 10c, 10d to collect waste particles W. Collector 12 is preferably a vented collector so that flow of the waste particles is maintained, thereby preventing particles from stopping and obstructing the flow.

A plurality of vacuum lines 14 are in fluid communication with collector 12 for transporting waste particles W to collector 12. The plurality of vacuum lines 14 is illustrated in FIG. 1 as 14a, 14b, 14c, 14d. As illustrated, one vacuum line is associated with each waste source, though more than one vacuum line can be associated with each waste source. Each vacuum line 14a, 14b, 14c, 14d includes an inlet 16a, 16b, 16c, 16d disposed adjacent each waste source 10a, 10b, 10c, 10d. Each vacuum line 14a, 14b, 14c, 14d has a vacuum level $V_a$, $V_b$, $V_c$, $V_d$, respectively.

A vacuum manifold 18 is in fluid communication with plurality of vacuum lines 14a, 14b, 14c, 14d. Manifold 18 is disposed downstream of vacuum lines 14a, 14b, 14c, 14d and converges the flow of vacuum through the plurality of vacuum lines to a single vacuum line, hereinafter referred to as vacuum tube 20. As illustrated in FIG. 1, vacuum tube 20 transports waste particles W to collector 12.

A vacuum source 22 provides a negative pressure through vacuum lines 14a, 14b, 14c, 14d and vacuum tube 20 to transport waste particles W. FIG. 1 shows vacuum source 22 as an ejector disposed within vacuum tube 20, for example, a PIAB ejector 300. An alternative arrangement is to position a conventional vacuum source originating at collector 12.

Each vacuum line 14a, 14b, 14c, 14d is provided with an ejector 24. As illustrated, ejectors 24a, 24b, 24c, 24d are disposed within vacuum lines 14a, 14b, 14c, 14d, downstream of the inlet and upstream of the manifold.

Preferably, ejectors are positioned close to the inlet, providing sufficient vacuum levels at the waste source and the capability of propelling the waste particles to manifold 18. Each of the ejectors provides an independent adjustable control of the vacuum level for its vacuum line. If the vacuum lines are of varying lengths and of varying configurations, the vacuum levels in each of the vacuum lines differ. As discussed above, it is preferable to have a uniform vacuum level through each of the vacuum lines. The present invention allows for the independent adjustment of the vacuum levels.

For example, the vacuum level at inlet 16a of vacuum line 14a can be adjusted by means of ejector 24a. The adjustment of the vacuum level for each inlet can be made independently of the vacuum levels of the other inlets. For example, the vacuum level at inlet 16a can be adjusted independently of the vacuum levels at inlets 16b, 16c, and 16d. As such, independent adjustments can be made for each of the inlets (i.e., 16a, 16b, 16c, 16d) until the vacuum levels at the inlets are uniform. Alternatively, the vacuum level at the inlets can be independently adjusted such that the vacuum level within each vacuum line is uniform.

This independent adjustment is accomplished by means of positioning ejector 24a–24d within each vacuum line 14a–14d, respectively, downstream of common manifold 18. As such, each waste source has a dedicated ejector with independent supply level control.

The apparatus of the present invention provides an anti-backup feature. Waste particles W will always flow from the waste source to the collector, and will not flow from the collector to the waste source. Because the negative pressure is directed through manifold 18, the vacuum level at manifold 18 and vacuum tube 20 is greater than the vacuum level in the vacuum lines 14a, 14b, 14c, 14d. Accordingly, no mechanical components are required to prevent waste particles from flowing away from collector 12 or from flowing from one waste source to another.

In operation, collector 12 is disposed remotely from the plurality of waste sources. A negative pressure is introduced into vacuum tube 20 and vacuum lines 14. An operator manually adjusts each ejector 24a, 24b, 24c, 24d, to adequately remove waste particles W from each waste source.

For the arrangement shown in FIG. 1, Applicants have found that the air supply to vacuum source 22 is approximately 10 percent greater than the sum of the vacuum levels at any three of ejectors 24a, 24b, 24c, 24d. Such an arrangement provides a maintained air flow directed toward collector 12, thereby eliminating the need for check valves or other electromechanical devices to maintain the one-directional air flow.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An apparatus for evacuating waste particles from a plurality of waste sources, comprising:

a collector disposed remotely from the plurality of waste sources to collect the waste particles;

a plurality of vacuum lines in fluid communication with said collector for transporting the waste particles to said collector, each of said vacuum lines having an inlet, at least one inlet being disposed adjacent each waste source, each of said inlets having a vacuum level;

a vacuum source in fluid communication with each of said plurality of vacuum lines for introducing a negative pressure through said plurality of vacuum lines;

a plurality of ejectors, one of said plurality of ejectors being disposed in each of said plurality of vacuum lines downstream of the waste source, each of said plurality of ejectors providing independent adjustable control of said vacuum level of each of said corresponding inlets; and a single vacuum manifold in fluid communication with said plurality of vacuum lines, said vacuum manifold being disposed downstream of said plurality of ejectors and upstream of said collector.

2. The apparatus according to claim 1 wherein said vacuum manifold has a predetermined vacuum level, and said predetermined vacuum level is greater than said vacuum levels of each of said inlets.

3. A method for evacuating waste particles from a plurality of waste sources, comprising:

disposing a collector remotely from the plurality of waste sources to collect the waste particles;

disposing an inlet of a vacuum line adjacent each of the plurality of waste sources;

introducing a negative pressure through a single vacuum manifold in fluid communication with said plurality of vacuum lines to direct an air flow toward the collector, said vacuum manifold being disposed downstream of said waste sources and upstream of said collector;

independently adjusting the negative pressure through each of said plurality of vacuum lines to independently control the negative pressure at each inlet; and transporting the waste particles through said vacuum lines to said collector.

4. The method for evacuating waste particles from a plurality of waste sources according to claim 3 wherein said negative pressure is introduced through said manifold such that said waste particles flow toward said collector and do not flow from said collector toward said plurality of waste sources.

* * * * *